United States Patent [19]
Miki et al.

[11] Patent Number: 5,102,979
[45] Date of Patent: Apr. 7, 1992

[54] POLYESTER AND PROCESS FOR PRODUCING THE SAME

[75] Inventors: Yasuaki Miki, Yokohama; Takayuki Ohta, Sagamihara; Shoji Takano, Yokohama, all of Japan

[73] Assignee: Mitsubishi Kasei Corporation, Tokyo, Japan

[21] Appl. No.: 532,567

[22] Filed: Jun. 4, 1990

[30] Foreign Application Priority Data

Jun. 22, 1989 [JP] Japan .................................. 1-159954
Jan. 29, 1990 [JP] Japan .................................. 2-18612
Jan. 29, 1990 [JP] Japan .................................. 2-18613

[51] Int. Cl.$^5$ .......................................... C08G 63/02
[52] U.S. Cl. ................................. 528/272; 528/295.3; 528/297; 528/298; 528/301; 528/302; 528/303; 528/307; 528/308; 528/308.6; 525/437; 525/438; 525/444; 525/447; 525/449; 525/450
[58] Field of Search ..................... 528/272, 295.3, 297, 528/298, 301, 302, 303, 307, 308, 308.6; 525/437, 438, 444, 447, 449, 450

[56] References Cited

U.S. PATENT DOCUMENTS 4,499,239 2/1985 Murakami et al. ................. 525/111

FOREIGN PATENT DOCUMENTS

74-5916 2/1974 Japan .
53-139696 12/1978 Japan .
53-131695 10/1979 Japan .
56-4627 1/1981 Japan .
58-162654 9/1983 Japan .
63-145328 6/1988 Japan .
01-236236 9/1989 Japan .

Primary Examiner—John Kight, III
Assistant Examiner—Sam A. Acquah
Attorney, Agent, or Firm—Oblon, Spivak, McClelland, Maier & Neustadt

[57] ABSTRACT

This invention provides a polyester, which is composed of a constitutive unit of formula (I) and a constitutive unit of formula (II) in a proportion of (I)/(II) of being from 0.1/99.9 to 99.1/0.1 as a molar ratio and which has a logarithmic viscosity ($\eta_{inh}$) of being 0.1 or more:

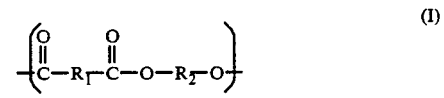

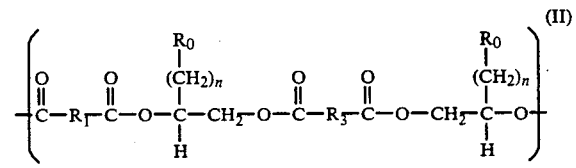

where $R_0$ is a fluorine-free monovalent organic group having from 1 to 40 carbon atoms, $R_1$, $R_2$ and $R_3$ are independently a divalent organic group having from 1 to 40 carbon atoms, and n is 0 or 1.

This invention also provides a method of preparing the polyester, in which (A) a monoepoxy compound of formula (III)

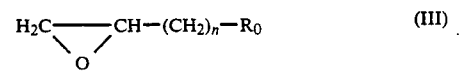

where $R_0$ and n have the same meanings as mentioned above, (B) a polyester or a polyester precursor and (C) a dicarboxylic acid compound are reacted and polymerized.

16 Claims, 10 Drawing Sheets

POLYESTER AND PROCESS FOR PRODUCING THE SAME

BACKGROUND OF THE INVENTION

This invention relates to a novel polyester, especially a polyester having various side chains, as well as to a process of producing the same, especially to that of using a monoepoxy compound as one comonomer component.

In order to modify polyesters for the purpose of improving the fluidity, interfacial adhesiveness or interfacial transferability of polyesters or of improving the compatibility or surface-treating property thereof, it is generally well known to vary the kinds of diols, dicarboxylic acids or derivatives thereof, which are components of constituting polyesters, as well as the constitutive proportions thereof or to introduce various comonomer components into polyesters thereby to attain the intended objects. However, modification of resins by such method results in variation of the structure or sequence of the main chain of the resulting resin. Therefore, the intended modification of resins would often have harmful effects on the resulting resins, for example, the mechanical strength of the resins themselves would be lowered by such modification. On the other hand, where an interfacial transferability is imparted to resins, a sufficient effect could not be obtained in most cases. Where resins are modified in order that various properties such as interfacial transferability, moisture-absorbability, hydrophilicity, water-repelling property or non-adhesiveness are imparted to resins themselves or the compatibility with solvents or other resins is controlled, or where resins are used as an adhesive between substances of different kinds, introduction of pertinent side chains into the resins would be rather better than variation of the structure of the main chain of the resins in order to attain the object with ease.

It is an object of this invention to provide a novel polyester, especially that which has been modified to have various side chains as mentioned above and which is useful.

It is another object of this invention to provide a process for producing such a novel polyester in which a monoepoxy compound and a dicarboxylic acid are used as comonomer components. In the polyester to be prepared by the process of this invention, the substituents on the monoepoxy compound used are in the side chains of the polyester molecule but not in the main chain of the polyester. Therefore, by selecting proper monoepoxy compounds, the intended modification of polyesters can be effected and accordingly, the adhesiveness and compatibility of the polyesters with other resins may thereby be improved.

SUMMARY OF THE INVENTION

This invention provides a polyester, which is composed of a constitutive unit as represented by the following general formula (I) and a constitutive unit as represented by the following general formula (II) in a proportion of (I)/(II) of being from 0.1/99.9 to 99.9/0.1 as a molar ratio and which has a logarithmic viscosity ($\eta_{inh}$) of being 0.1 or more:

where
 $R_0$ represents a monovalent fluorine-free organic group having from 1 to 40 carbon atoms;
 $R_1$, $R_2$ and $R_3$ independently represent a divalent organic group having from 1 to 40 carbon atoms; and
 n represents 0 or 1.

This invention also provides a process for producing a polyester, in which (A) a monoepoxy compound as represented by the following general formula (III), (B) a polyester or polyester precursor and (C) a dicarboxylic acid compounds are reacted and polymerized.

where $R_0$ and n have the same meanings as defiend above.

DETAILED DESCRIPTION OF THE INVENTION

In the polyester of this invention, $R_0$ in the formula (II) represents a monovalent fluorine-free organic group having from 1 to 40, preferably from 4 to 30, carbon atoms. Specific examples of the group are as follows:

(1) A linear or cyclic, saturated, unsaturated or aromatic hydrocarbon group having from 1 to 40 carbon atoms, for example, an alkyl group such as methyl group, ethyl group, propyl group, isopropyl group, butyl group, t-butyl group, octyl group, 2-ethylhexyl group, dodecyl group, pentadecyl group, etc.; a cycloalkyl group such as cyclohexyl group, etc.; an alkenyl group such as allyl group, hexenyl group, etc.; or an aryl group such as phenyl group, naphthyl group, biphenyl group, etc.

(2) An alkyloxy, alkenyloxy or aryloxy group having from 1 to 40 carbon atoms, for example, methoxy group, ethoxy group, propoxy group, butoxy group, allyloxy group, hexenyloxy group, phenoxy group, benzyloxy group, naphthyloxy group, biphenyloxy group, methoxyphenyloxy group, etc.

(3) An alkylcarbonyloxy group such as an arylcarbonyloxy group such as etc.; or an alkenylcarbonyloxy group including a (meth)acryloyl group such as (4) A hetero ring-containing organic group, such as a furyl(oxy) group, an oxazolyl(oxy) group, a thiazolyl(oxy) group, a pyranyl(oxy) group, etc.

(5) A silicon-containing organic group, such as preferably a siloxane group or an alkoxysilyl group.

(6) A halogen-containing organic group, such as

-continued (7)

Among them, preferred are (1) a linear or cyclic, saturated or unsaturated hydrocarbon group such as an alkyl, cycloalkyl or aryl group, (2) an alkyloxy group, an alkenyloxy group or an aryloxy group, more preferably an alkyloxy group, and (5) a silicon-containing organic group. Of the groups, those having 4 or more carbon atoms are especially preferred. $R_1$ and $R_3$ independently represent a divalent organic group having from 1 to 40, preferably from 4 to 40, carbon atoms and correspond to a residue of a dicarboxylic acid of HOOC—$R_1$—COOH or HOOC—$R_3$—COOH, respectively. Such dicarboxylic acids include, for example, terephthalic acid, methoxyterephthalic acid, ethoxyterephthalic acid, fluoroterephthalic acid, chloroterephthalic acid, methylterephthalic acid, isophthalic acid, phthalic acid, methoxyisophthalic acid, diphenylmethane-4,4'-dicarboxylic acid, diphenylmethane-3,3'-dicarboxylic acid, diphenylether-4,4'-dicarboxylic acid, 2,2'-biphenyldicarboxylic acid, 4,4'-biphenyldicarboxylic acid, naphthalene-2,6-dicarboxylic acid, naphthalene-1,5-dicarboxylic acid, naphthalene-1,4-dicarboxylic acid, 2,5-norbornane-dicarboxylic acid, adipic acid, sebacic acid, azelaic acid, suberic acid, dodecanedicarboxylic acid, 2-methyladipic acid, trimethyladipic acid, 3-methylazelaic acid, 2,2-dimethylglutaric acid, succinic acid, cyclohexane-1,4-dicarboxylic acid, cyclohexane-1,3-dicarboxylic acid, cyclopentane-1,3-dicarboxylic acid, thiodipropionic acid, 4,4'-sulfonyldibenzoic acid, as well as dimer acids and dimer acid hydrides.

As dimer acids which are usable in this invention, there are mentioned polymer fatty acids obtained by polymerizing unsaturated fatty acids, for example, monobasic fatty acids derived from natural fats and oils or synthetic monobasic fatty acids, which have from 8 to 24 carbon atoms and have one or more double bonds or triple bonds. Specific examples of such acids includes dimers of linolenic acid, linolic acid, etc.

Commercial polymer fatty acids are generally composed of dimer fatty acids as an essential component and additionally other fatty acids or trimer fatty acids to be derived from the raw materials used for preparing the acids. However, those having a dimer fatty acid content of 70% by weight or more, preferably 95% by weight or more, more preferably 98% by weight or more are desirably employed in this invention.

Commercial polymer fatty acids may be distilled to elevate the dimer fatty acid content in the resulting acids prior to being used in this invention, or as the case may be, they may be hydrogenated to lower the unsaturation degree in the resulting acids for use in this invention.

Above all, $R_1$ is preferably an aromatic dicarboxylic acid residue having from 6 to 15 carbon atoms, or an aliphatic dicarboxylic acid residue having from 1 to 10 carbon atoms; and $R_3$ is preferably an aromatic dicarboxylic acid residue having from 6 to 15 carbon atoms, an aliphatic dicarboxylic acid residue having from 1 to 10 carbon atoms, or a dimer acid residue or a hydrogenated dimer acid residue.

Especially preferably, $R_1$ is a residue of a terephthalic acid, isophthalic acid or naphthalene-dicarboxylic acid; and $R_3$ is a residue of a terephthalic acid, isophthalic acid, phthalic acid, naphthalene-dicarboxylic acid, adipic acid, sebacic acid, dimer acid or hydrogenated dimer acid. $R_1$ and $R_3$ may be same as or different from each other.

$R_2$ represents a divalent organic group having from 1 to 40 carbon atoms, preferably from 2 to 20, more preferably from 2 to 10, carbon atoms and corresponds to a residue of a diol of a general formula $HO-R_2-OH$. Such diols include, for example, ethylene glycol, 1,3-propanediol, 1,2-propanediol, 1,3-butanediol, 1,4-butanediol, neopentyl glycol, 1,6-hexanediol, 1,12-dodecanediol, cyclohexane-1,4-diol, cyclohexane-1,3-diol, cyclohexane-1,2-diol, cyclopentane-1,3-diol, diethylene glycol, polyethylene glycol, hydroquinone, resorcinol, methylhydroquinone, acetylhydroquinone, 1,4-dihydroxynaphthol, 1,5-dihydroxynaphthol, bisphenol A, 4,4'-dihydroxydiphenyl, bis(4-hydroxyphenyl)-ketone, bis(4-hydroxyphenyl)sulfone, dimer acid-hydrogenated diols, polyolefin-polyols, etc.

Among them, especially preferred are ethylene glycol, 1,4-butanediol, diethylene glycol, etc.

The polyester of this invention is one containing constitutive units of the above-mentioned formulae (I) and (II) at random, in which the proportion of (I) to (II) is (I)/(II)=0.1/99.9 to 99.9/0.1, preferably (I)/(II)=20/80 to 80/20, as a molar ratio. The polyester has a logarithmic viscosity ($\eta_{inh}$) of 0.1 or more, preferably from 0.3 to 2, as measured in a mixed solvent of phenol/tetrachloroethane (50/50, by weight) in a concentration of 0.5 g/dl, at 30° C.

Next, a process of producing the polyester of this invention will be explained below. Briefly, the polyester of this invention is obtained by blending (A) an epoxy compound as represented by the formula (III), (B) a polyester or polyester precursor and (C) a dicarboxylic acid compound, reacting them under heat and polymerizing them under reduced pressure.

More precisely, as examples of monoepoxy compounds (A) as represented by the formula (III), there are mentioned epoxy compound of the formula (III) where $R_0$ is an alkyl group having approximately from 1 to 40 carbon atoms, such as alkylglycidyl ethers having approximately from 1 to 40 carbon atoms, such as epoxidated compounds of (poly)alkylene glycol monoalkyl ethers, such as epoxy compounds of the formula (III) where $R_0$ is an alkenyl group having approximately from 1 to 40 carbon atoms, such as epoxy compounds of the formula (III) where $R_0$ is —O—Ar, and Ar is an optionally substituted aromatic group having from approximately 6 to 40 carbon atoms, such as as well as epoxy compounds of the formula (III) where $R_0$ is a silicon- or nitrogen-containing organic group having approximately from 1 to 40 carbon atoms, such as These are used singly or as a mixture of two or more of them.

Of polyesters or polyester precursors (B) to be used in this invention, polyesters are ones having a repeating unit of a general formula (IV):

(IV)

where $R^1$ and $R^2$ independently represent a divalent organic group having from 1 to 40 carbon atoms.

Such polyesters can be obtained by condensation reaction of a dicarboxylic acid compound or an ester thereof and a diol compound. Examples of such dicarboxylic acid compounds include malonic acid, succinic acid, glutaric acid, adipic acid, pimelic acid, sebacic acid, azelaic acid, suberic acid, dodecanedicarboxylic acid, 3-methylazelaic acid, cyclohexane-1,3-dicarboxylic acid, cyclopentane-1,3-dicarboxylic acid, terephthalic acid, methoxyterephthalic acid, ethoxyterephthalic acid, fluoroterephthalic acid, chloroterephthalic acid, methylterephthalic acid, isophthalic acid, phthalic acid, methoxyisophthalic acid, diphenylmethane-4,4'-dicarboxylic acid, diphenylmethane-3,3'-dicarboxylic acid, diphenyl ether-4,4'-dicarboxylic acid, diphenyl-4,4'-dicarboxylic acid, naphthalene-2,6-dicarboxylic acid, naphthalene-1,5-dicarboxylic acid, naphthalene-1,4-dicarboxylic acid, 2,5-norbornane-dicarboxylic acid, 4,4'-oxy-di-benzoic acid, 4,4-methylene-di-benzoic acid, diglycolic acid, thio-dipropionic acid, dibenzoic acid, p-oxy (p-carboxyphenyl)benzoic acid, tetramethylene-bis(p-oxybenzoic acid), dimer acids, hydrogenated dimer acids, and esters of the said acids.

These dicarboxylic acids and esters thereof can be used singly or as a mixture of two or more of them.

As examples of diols to give polyesters of the formula (IV), there are mentioned ethylene glycol, diethylene glycol, polyethylene glycol, 1,2-propanediol, 1,3-propanediol, 1,2-butanediol, 1,3-butanediol, 1,4-butanediol, 2,4-dimethyl-2-ethyl-1,3-hexanediol, 2,2,4-trimethyl-1,3-pentanediol, neopentyl glycol, 1,6-hexanediol, 1,12-dodecanediol, cyclohexane-1,4-diol, cyclohexane-1,3-diol, 1,4-cyclohexanedimethanol, p-xylenediol, 4,4'-thiodiphenol, 4,4'-methylenediphenol, 4,4'-dihydroxybiphenyl, 4,4'-isopropylidenediphenol, 4,4'-isopropylidene-bis(2,6-dichlorophenol), 2,5-naphthalenediol, 2,5-norbornanediol, hydroquinone, resorcinol, methyl-hydroquinone, chlorohydroquinone, acetylhydroquinone, acetoxyhydroquinone, nitrohydroquinone, dimethylaminohydroquinone, 1,4-dihydroxynaphthol, 1,5-dihydroxynaphthol, 1,6-dihydroxynaphthol, 2,6-dihydroxynaphthol, 2,7-dihydroxynaphthol, 2,2-bis(4-hydroxy-3,5-dichlorophenyl)-propane, 2,2-bis(4-hydroxy-3-methylphenyl)-propane, 2,2-bis(4-hydroxy-3-chlorophenyl)propane, bis(4-hydroxy-3,5-dimethylphenyl)-methane, bix(4-hydroxy-3,5-dichlorophenyl)-methane, bis(4-hydroxy-3,5-dibromophenyl)-methane,1,1-bis(4-hydroxy-phenyl)cyclohexane, 4,4'-dihydroxydiphenyl-bis(4-hydroxyphenyl)-ketone, bis(4-hydroxy-3,5-dichlorophenyl)ketone, bis(4-hydroxyphenyl) sulfide, bis(4-hydroxy-3-chlorophenyl)sulfide, bis(4-hydroxyphenyl)sulfone, bis(4-hydroxy-3,5-dichlorophenyl)ethers, dimer acid-hydrogenated diols, polyolefin polyols, etc. These diols are used singly or as a mixture of two or more of them.

Of the group (B), polyester precursors are compounds as represented by the following general formulae (V) to (VII):

(V)

(VI)

-continued

In these formulae, m represents a natural number including 0; $R_1$ and $R_2$ independently represent a divalent organic group having from 1 to 40 carbon atoms; and $R_4$ represents a hydrogen atom, or an alkyl or aromatic group having from 1 to 15 carbon atoms.

For example, there are mentioned oligomers of the above-mentioned polyesters, bishydroxyethyl terephthalate, bishydroxypropyl terephthalate, bishydroxybutyl terephthalate, etc.

Additionally, methyl p-hydroxybenzoate, ethyl p-hydroxybenzoate, methyl 3-hydroxybenzoate, ethyl 3-hydroxybenzoate, etc. may also be employed.

As the dicarboxylic acid compounds (C) to be used in this invention, dicarboxylic acids as well as esters thereof which have been illustrated hereinabove as the above-mentioned polyester-constitutive component can be employed singly or as a mixture of two or more of them. Among them, aromatic dicarboxylic acids having from 8 to 20 carbon atoms, aliphatic dicarboxylic acids having from 3 to 15 carbon atoms, as well as dimer acids and hydrogenated dimer acids are preferred.

The monoepoxy compound, dicarboxylic acid, and polyester or polyester precursor can be reacted in any desired proportion. Preferably, however, the proportion of the monoepoxy compound is form 0.1 to 100 parts by weight, especially preferably from 10 to 100 parts by weight, and that of the dicarboxylic acid is from 0.1 to 100 parts by weight, especially preferably from 10 to 100 parts by weight, each to 100 parts by weight of the polyester or polyester precursor. More preferably, the molar ratio of the monoepoxy compound to the dicarboxylic acid is 2, in reacting the reactants.

Regarding the procedure of the reaction, a monoepoxy compound (III) is first reacted with a dicarboxylic acid and thereafter reacted with a polyester or polyester precursor. Alternatively, all the monoepoxy compound, dicarboxylic acid, and polyester or polyester precursor may be reacted at a time.

In any case, the reaction is effected first at 50° to 300° C., preferably at 120° to 270° C., at normal pressure for 5 minutes to 10 hours, and then further effected at 150° to 350° C., preferably at 170° to 300° C., under reduced pressure to complete the polymerization.

In the reaction procedure, it is preferred that the molar ratio of the epoxy compound to the dicarboxylic acid is adjusted to be from 1.5/1 to 2.0/1 and the reaction is effected at normal pressure until the acid degree of the reaction mixture has become less than 10% of the acid degree thereof at the initial stage of the reaction and then reduction of the reaction pressure is initiated, whereby a polymer having a relatively high molecular weight can be obtained stably.

Reduction of the reaction pressure in the said reaction procedure is preferably effected gradually, and more preferably, the time necessary for reducing the pressure from normal pressure to 1 mmHg is 30 minutes or more. Especially preferably, reduction of the pressure from 10 mmHg to 1 mmHg is effected gradually.

The reaction and polymerization may be effected in the absence of a catalyst, but if desired, a catalyst is added to effect the reaction and polymerization.

As examples of catalysts usable in the reaction or polymerization, there are mentioned tertiary amines such as benzyldimethylamine, dimethylaminopyridine, tributlyamine, etc.; as well as metal catalysts such as tetrabutoxy titanium, germanium dioxide, antimony trioxide, calcium acetate, magnesium acetate, zinc acetate, etc. These catalysts can be used singly or as a mixture of two or more of them. The amount of the catalyst to be used may be within the range of from 1 to 50,000 ppm to the amounts of the raw materials to be used or to the amount of the polymer to be formed. Regarding the timing of adding the catalyst, addition of a catalyst immediately before initiation of reduction of the reaction pressure is recommended for the purpose of constantly obtaining a polymer having a high molecular weight.

Into the polyesters of this invention, various side chains of any desired kind can be introduced. Therefore, control of the solubility of the resins (polyesters) in solvents, improvement of the compatibility of the resins with other resins, and impartation of interfacial transferability to the resins may be effected with ease. On these grounds, the polyesters of this invention can be used as a resin-reinforcing agent, a high polymer plasticizer, a surface-modifying agent, an adhesive, a mould release agent, a compatibilizer for polymer alloys, etc. Additionally, the polyesters of this invention can be shaped into various shaped articles such as films or sheets.

Next, the present invention will be explained in more detail by way of the following examples. However, this invention is not limited to only the illustrated examples but includes other various modifications without departing from the scope and the spirit thereof.

EXAMPLE 1

1.72 g (0.172 mol) of adipic acid, 20.0 g (0.0787 mol) of bishydroxyethyl terephthalate and 6.51 g of linear monoepoxy compound (AOEX-68, trade name by Daisel Co.) were fed into a glass polymerizer tube equipped with a stirring blade, a nitrogen-introducing duct and a pressure-reducing duct, and a cycle of pressure reduction-nitrogen substitution was repeated three times. AOEX-68 is a mixture (almost 1:1, by weight) of the compound of the above-mentioned formula (III):

where $R_0$ is $C_{14}$ linear alkyl group and $n=0$, and the compound of the formula (III) where $R_0$ is $C_{16}$ linear alkyl group and $n=0$.

The polymerizer tube was heated up to 230° C. and the reactants were reacted for 3 hours under normal pressure. Next, 1.4 g of antimony trioxide-1% ethylene glycol solution was added thereto, and the pressure in the polymerizer was gradually reduced with maintaining the reaction temperature of being 230° C. At last, the internal pressure was kept at 0.5 mmHg. Under such reduced pressure, polymerization was effected for 6 hours. Afterwards, nitrogen was introduced into the polymerizer tube so that the internal pressure was returned back to normal pressure. Then, the product was taken out from the bottom of the polymerizer tube. The thus obtained polymer was pale yellow and transparent and had a logarithmic viscosity ($\eta_{inh}$) of 0.54 dl/g, in a mixed solvent of phenol/tetrachloroethane (50/50, by weight) in a concentration of 0.5 g/dl, at 30° C.

Figure 1:
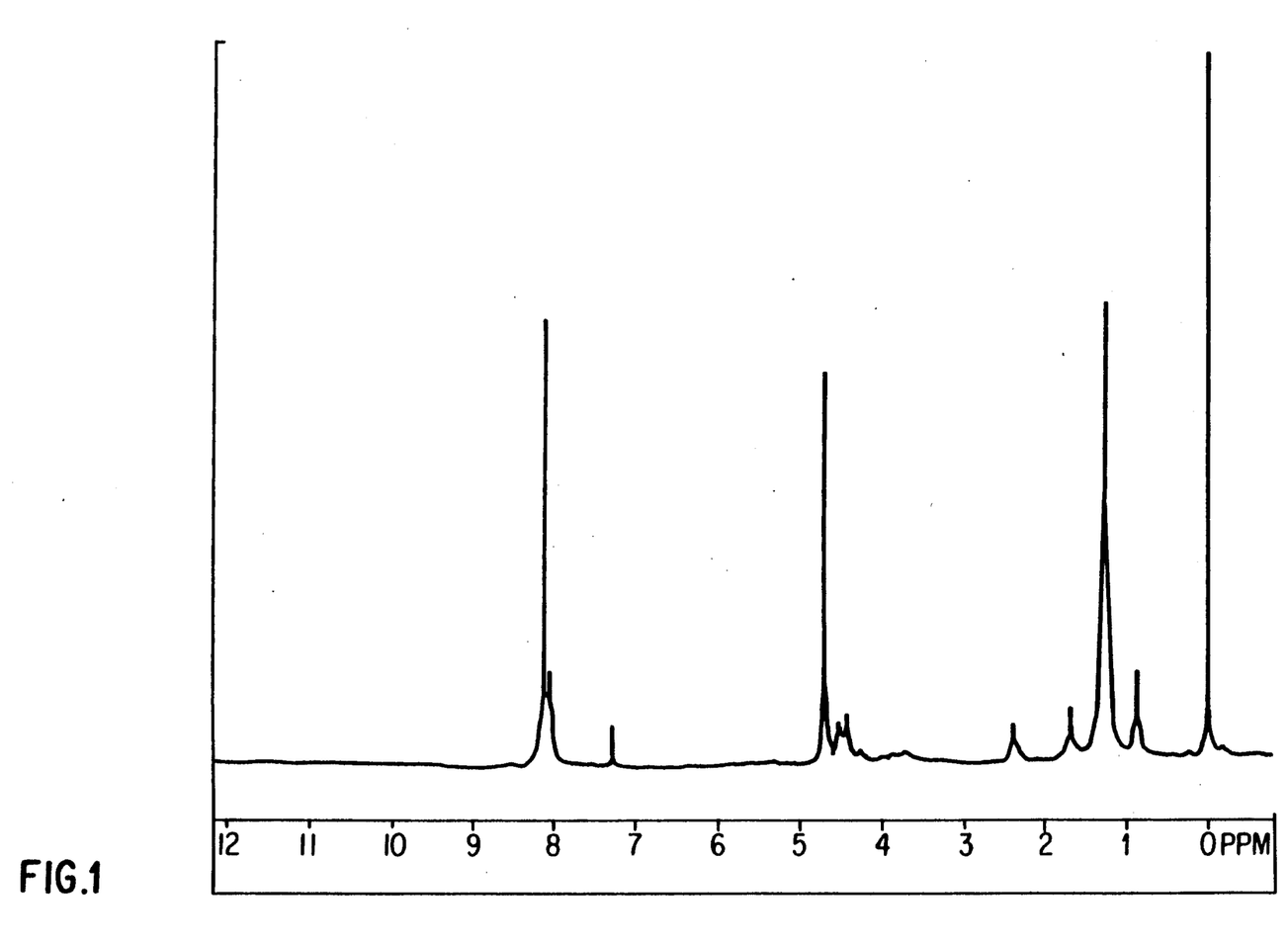
FIG. 1 is a $^1$H-NMR spectrum of the polymer obtained in Example 1.
Figure 2:
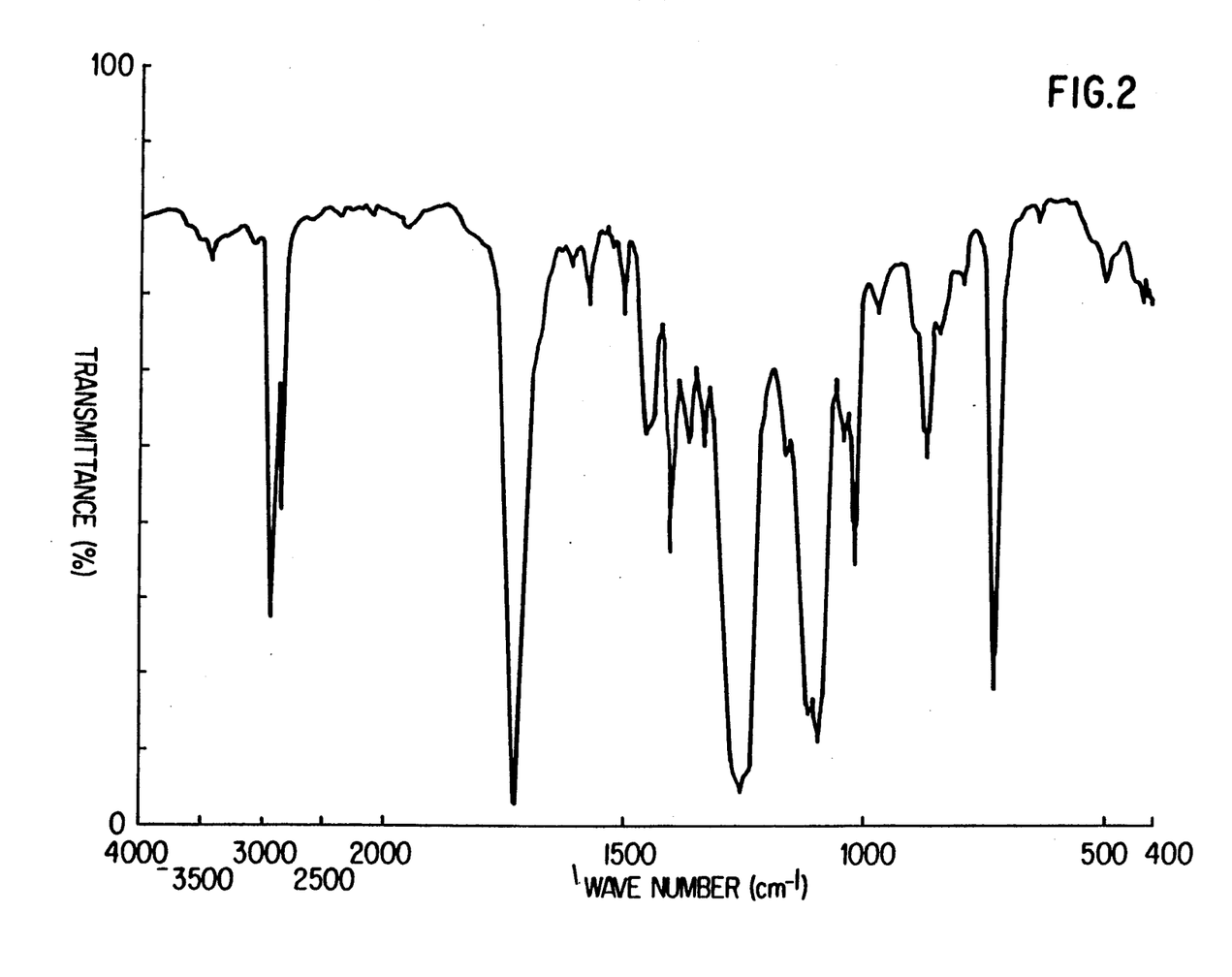
FIG. 2 is an IR spectrum of the said polymer.

FIG. 1 and FIG. 2 shows the $^1$H-NMR spectrum of the polymer obtained and the IR spectrum thereof, respectively.

The proportion of the constitutive units of the polymer obtained may easily be calculated out from the amounts of the raw materials as fed into the reactor tube but may also be obtained form the $^1$H-NMR spectrogram of the polymer.

EXAMPLE 2

1.15 g (0.00786 mol) of adipic acid, 20.0 g (0.0787 mol) of bishydroxyethyl terephthalate and 4.34 g of the same linear monoepoxy compound (AOEX-68, trade name by Daisel Co.) as that employed in Example 1 were fed into the same polymerizer tube as that employed in Example 1, and a cycle of pressure reduction-nitrogen substitution was effected three times.

The polymerizer tube was heated up to 230° C. and the reactants were reacted for 3 hours at normal pressure. Next, 1.4 g of antimony trioxide-1% ethylene glycol solution was added thereto, and the pressure in the polymerizer was gradually reduced with maintaining the reaction temperature of being 230° C. At last, the internal pressure was kept at 0.5 mmHg. Under such reduced pressure, polymerization was effected for 6 hours and then the pressure was returned back to normal pressure with nitrogen. The polymer thus formed was then taken out from the bottom of the polymerizer tube.

Figure 3:
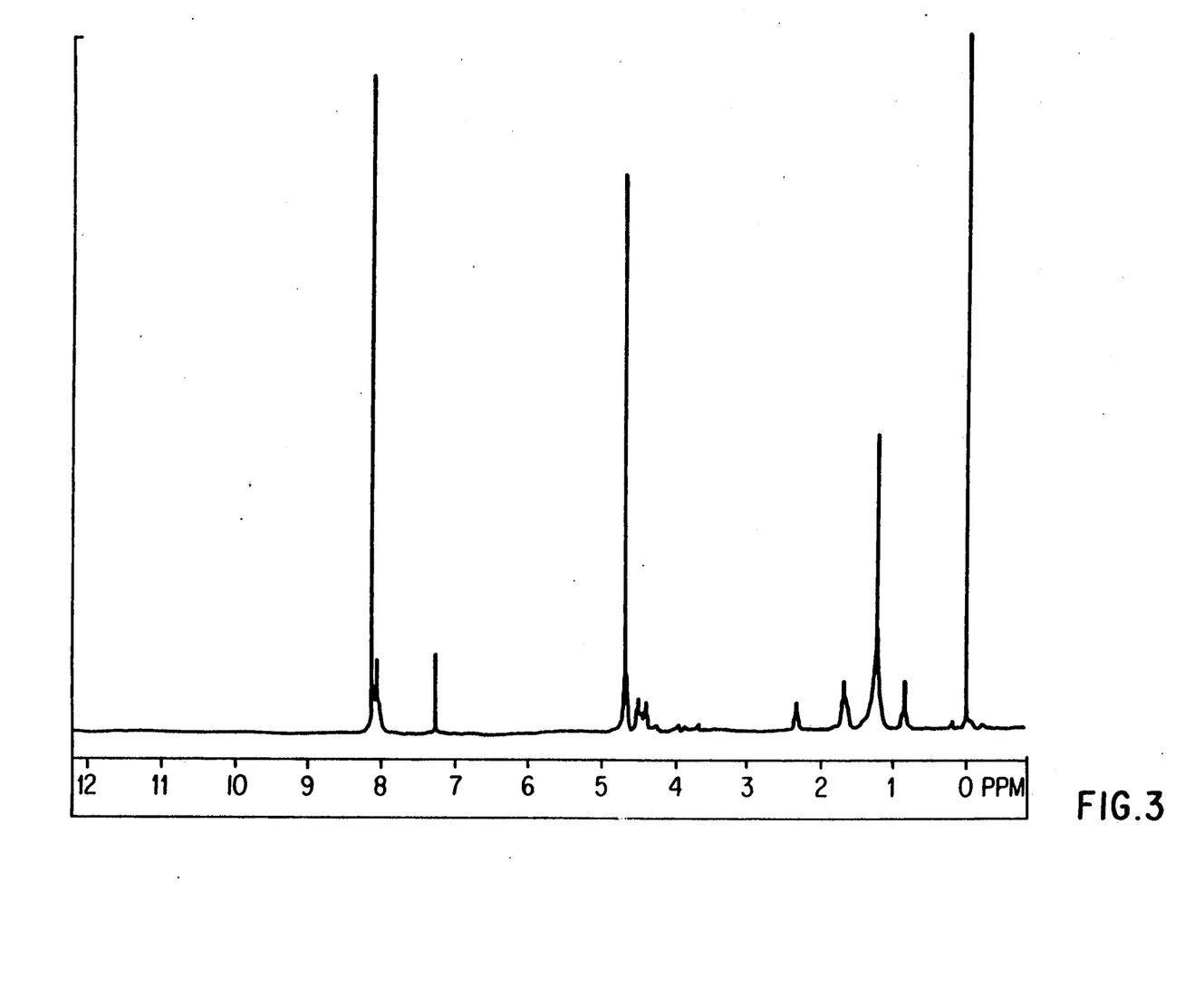
FIG. 3 is a $^1$H-NMR spectrum of the polymer obtained in Example 2.

The thus obtained polymer was pale yellow and transparent, and it had a logarithmic viscosity ($\eta_{inh}$) of being 0.58 dl/g (measured under the same condition as in Example 1). FIG. 3 shows the $^1$H-NMR spectrum of the polymer obtained.

EXAMPLE 3

4.70 g (0.0283 mol) of terephthalic acid, 7.05 g (0.0424 mol) of isophthalic acid, 39.1 g of the same linear monoepoxy compound (AOEX-68, trade name by Daisel Co.) as that employed in Example 1, and 90.0 g (0.354 mol) of bishydroxyethyl terephthalate were fed into the same polymerizer tube as that employed in Example 1, and a cycle of pressure reduction-nitrogen substitution was effected three times.

The polymerizer tube was heated up to 230° C. and the reactants were reacted for 2.5 hours under normal pressure. Next, 0.1 g of tetrabutoxy titanium was added thereto, and the pressure in the polymerizer was gradually reduced with maintaining the polymerization system as it was. At last, the internal pressure was kept at 0.5 mmHg. Under such reduced pressure, polymerization was effected for 5 hours and then the pressure was returned back to normal pressure with nitrogen. The polymer formed was taken out from the bottom of the polymerizer tube.

Figure 4:
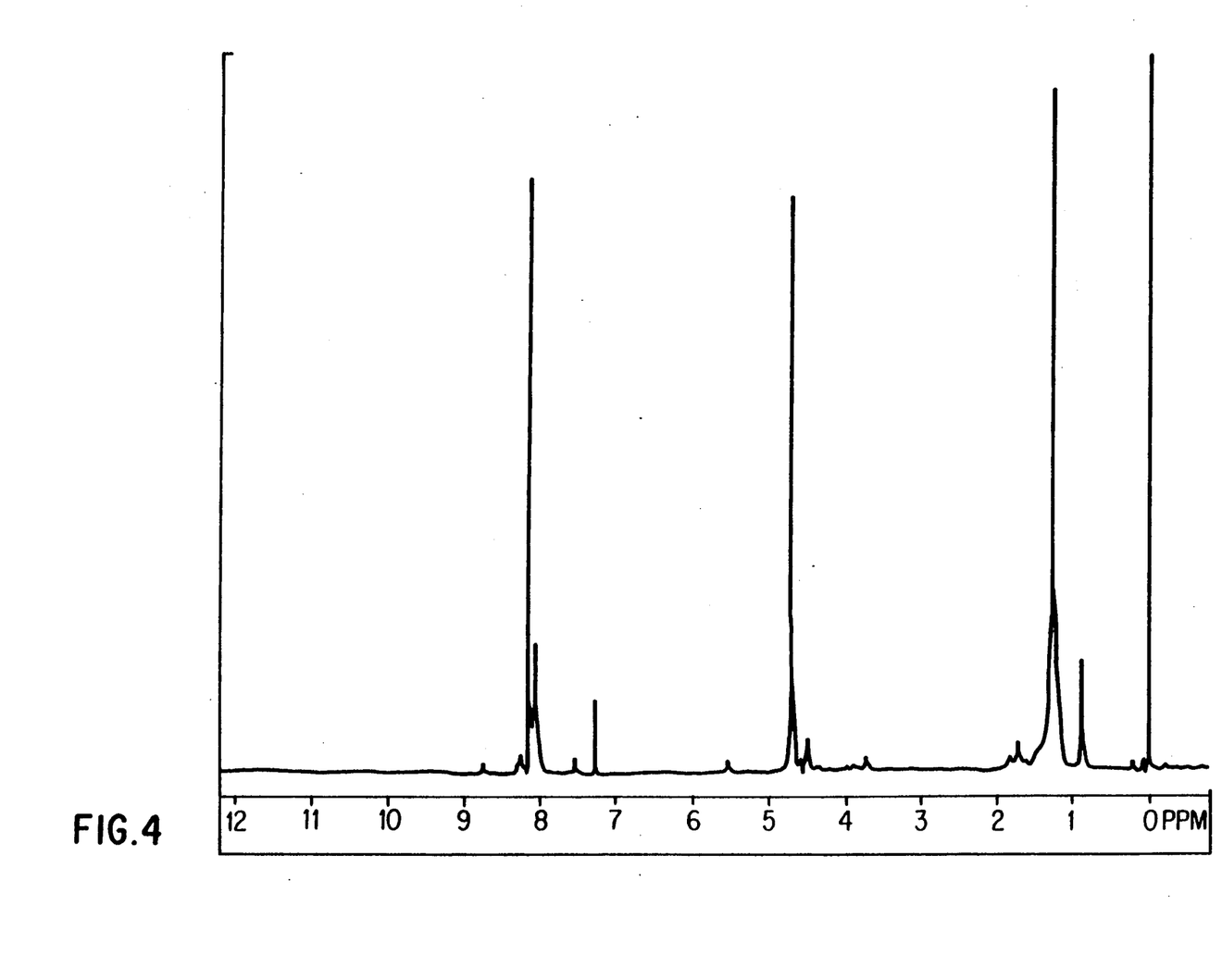
FIG. 4 is a $^1$H-NMR spectrum of the polymer obtained in Example 3.
Figure 5:
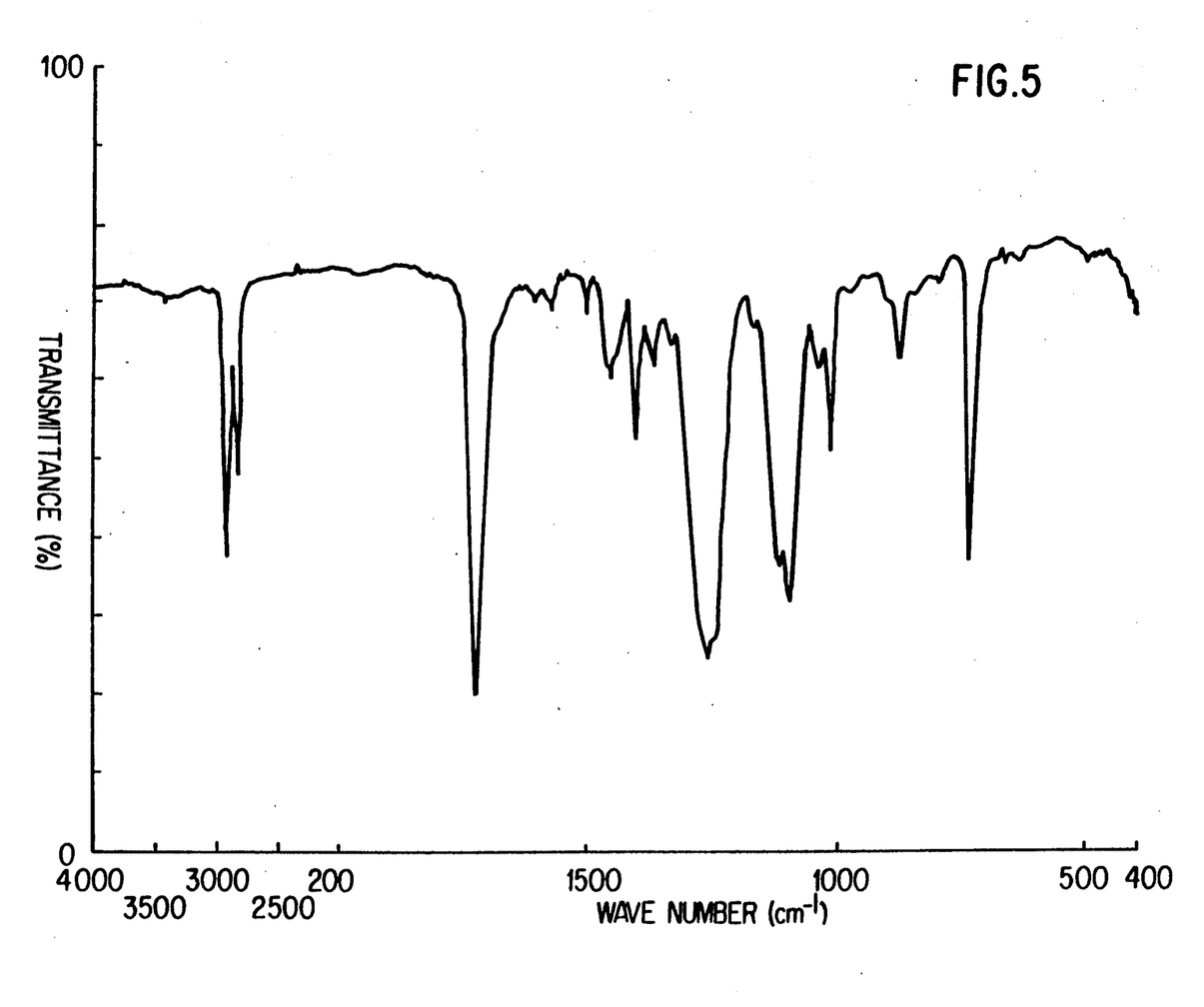
FIG. 5 is an IR spectrum of the said polymer.

The thus obtained polymer was pale yellow and transparent and had a logarithmic viscosity ($\eta_{inh}$) of 0.62 dl/g (measured under the same condition as in Example 1). FIG. 4 and FIG. 5 show the $^1$H-NMR spectrum of the polymer obtained and the IR spectrum thereof, respectively.

EXAMPLE 4

26.7 g of hydrogenated dimer acid compound (PRIPOL 1009, trade name by Unichema International Co.), 26.0 g of the same linear monoepoxy compound as that employed in Example 1 (AOEX-68, trade name by Daisel Co.), and 60.0 g of bishydroxyethyl terephthalate were fed into the same polymerizer tube as that employed in Example 1, and a cycle of pressure reduction-nitrogen substitution was effected three times.

The polymerizer tube was heated up to 230° C. and the reactants were reacted for 4 hours at normal pressure. Next, 6.0 g of antimony trioxide-1% ethylene glycol solution was added thereto, and the pressure in the polymerizer was gradually reduced with maintaining the polymerization system as it was. At last, the internal pressure was kept at 0.5 mmHg. Under such reduced pressure, polymerization was effected for 6 hours and then the pressure was returned back to normal pressure with nitrogen. The polymer formed was taken out from the bottom of the polymerizer tube.

Figure 6:
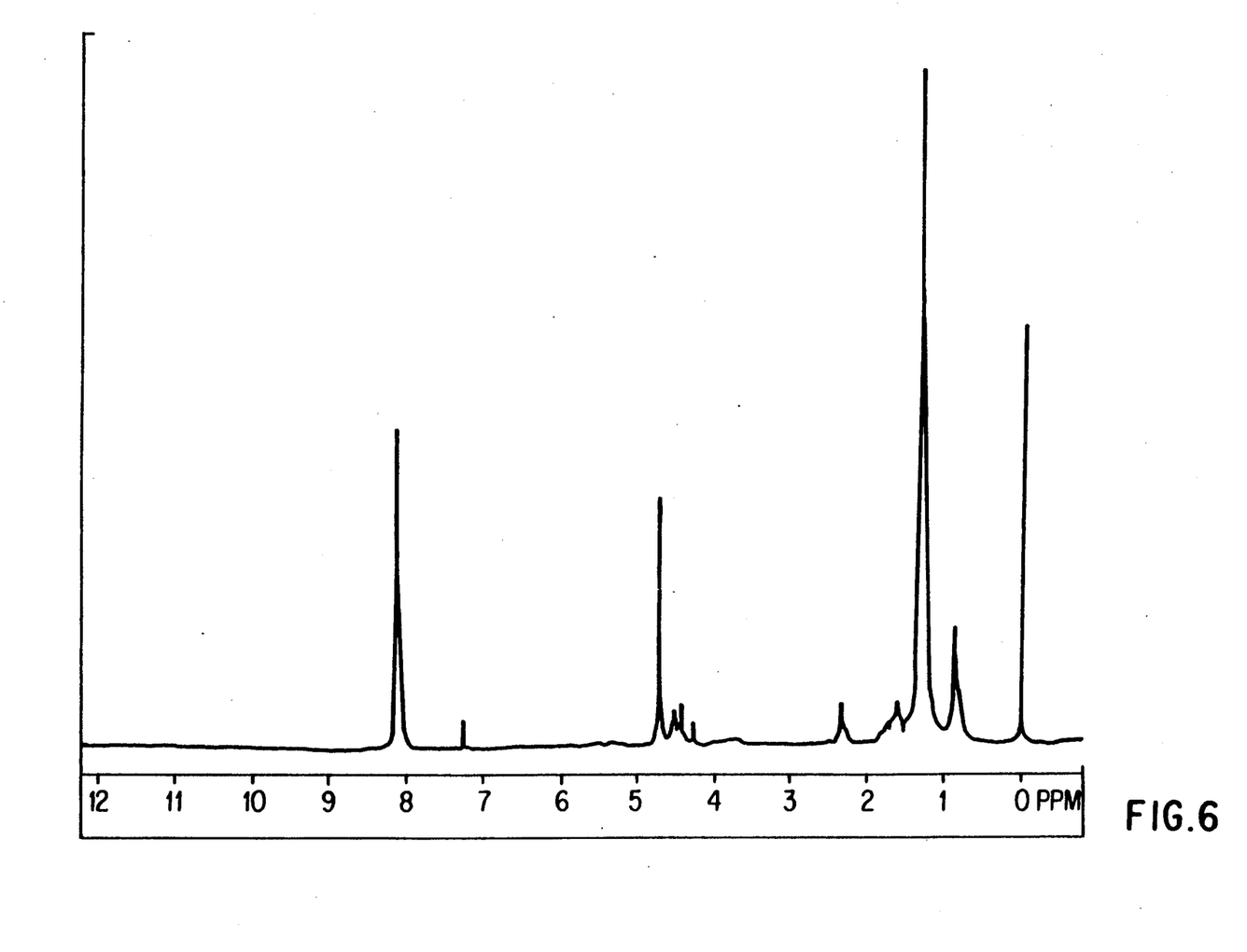
FIG. 6 is a $^1$H-NMR spectrum of the polymer obtained in Example 4.

The thus obtained polymer was pale yellow and transparent and had a logarithmic viscosity ($\eta_{inh}$) of 0.47 dl/g (measured under the same condition as in Example 1). FIG. 6 shows the $^1$H-NMR spectrum of the polymer obtained.

EXAMPLE 5

2.29 g (0.0157 mol) of adipic acid, 20.0 g (0.0787 mol) of bis hydroxyethyl terephthalate and 11.7 g of linear monoepoxy compound having from 20 to 28 carbon atoms (AOEY-03, trade name by Daisel Co.) were put in the same polymerizer tube as that employed in Example 1, and a cycle of pressure reduction-nitrogen substitution was effected three times. AOEY-08 is a mixture of compounds of the above-mentioned formula (III) (where n=0) where $R_0$ is a linear alkyl group having from 18 to 26 carbon atoms.

The polymerizer tube was heated up to 230° C. and the reactants were reacted for 5 hours at normal pressure. Next, 1.6 g of antimony trioxide-1% ethylene glycol solution was added thereto, and the pressure in the polymerizer was gradually reduced with maintaining the polymerization system as it was. At last, the internal pressure was kept at 0.5 mmHg. Under such reduced pressure, polymerization was effected for 8 hours and then the pressure was returned back to normal pressure with nitrogen. The polymer formed was taken out from the bottom of the polymerizer tube.

Figure 7:
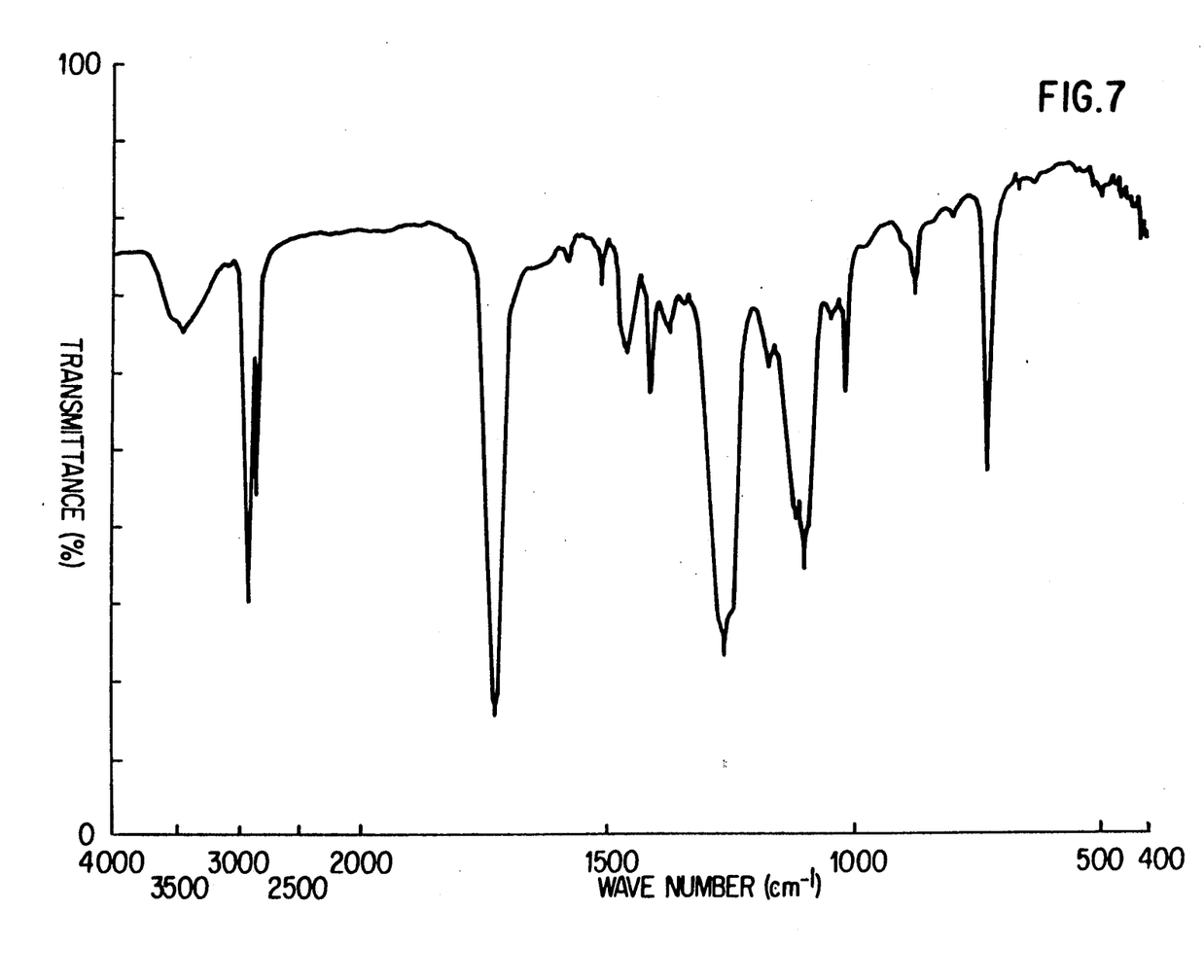
FIG. 7 is a $^1$H-NMR spectrum of the polymer obtained in Example 5.

The thus obtained polymer was pale yellow and transparent and had a logarithmic viscosity ($\eta_{inh}$) of 0.47 dl/g (measured under the same condition as in Example 1). FIG. 7 shows the IR spectrum of the polymer obtained.

EXAMPLE 6

2.30 g (0.0157 mol) of adipic acid, 4.10 g (0.315 mol) of butylglycidyl ether and 20.0 g (0.0787 mol) of bishydroxyethyl terephthalate were fed into the same polymerizer tube as that employed in Example 1, and a cycle of pressure reduction-nitrogen substitution was effected three times.

The polymerizer tube was heated up to 230° C. and the reactants were reacted for 3 hours at normal pressure. Next, 1.5 g of antimony trioxide-1% ethylene glycol solution was added thereto, and the pressure in the polymerizer was gradually reduced with maintaining the polymerization system as it was. At last, the internal pressure was kept at 0.5 mmHg. Under such reduced pressure, polymerization was effected for 6 hours and then the pressure was returned back to normal pressure with nitrogen. The polymer formed was taken out from the bottom of the polymerizer tube.

Figure 8:
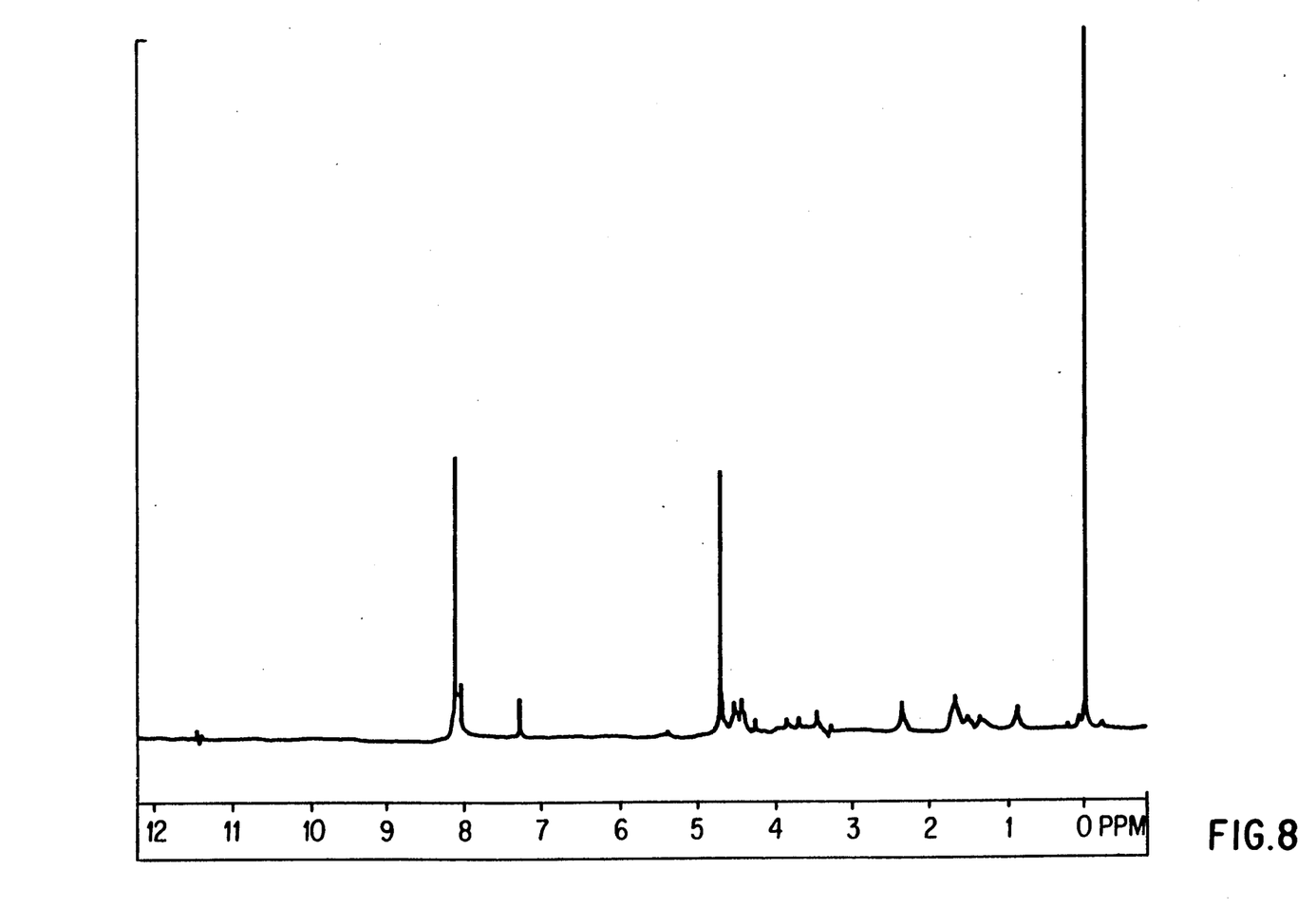
FIG. 8 is a $^1$H-NMR spectrum of the polymer obtained in Example 6.

The thus obtained polymer was pale yellow and transparent and had a logarithmic viscosity ($\eta_{inh}$) of 0.33 dl/g (measured under the same condition as in Example 1). FIG. 8 shows the $^1$H-NMR spectrum of the polymer obtained.

EXAMPLE 7

1.72 g (0.0118 mol) of adipic acid and 6.51 g of the same linear monoepoxy compound (AOEX-68, trade name by Daisel Co.) as that employed in Example 1 were fed the same polymerizer tube as that employed in Example 1 and reacted at 150° C. for 2 hours. Next, 20.0 g of polyethylene terephthalate (PET) was added thereto, and the content in the polymerizer tube was heated up to 270° C. This was stirred for 2 hours at 270° C. as it was and then the pressure in the tube was gradually reduced to a reduced internal pressure of 0.5 mmHg. Accordingly, polymerization was effected for 2 hours under reduced pressure of 0.5 mmHg. After the pressure was returned back to normal pressure with nitrogen, the product formed was taken out from the bottom of the polymerizer tube.

Figure 9:
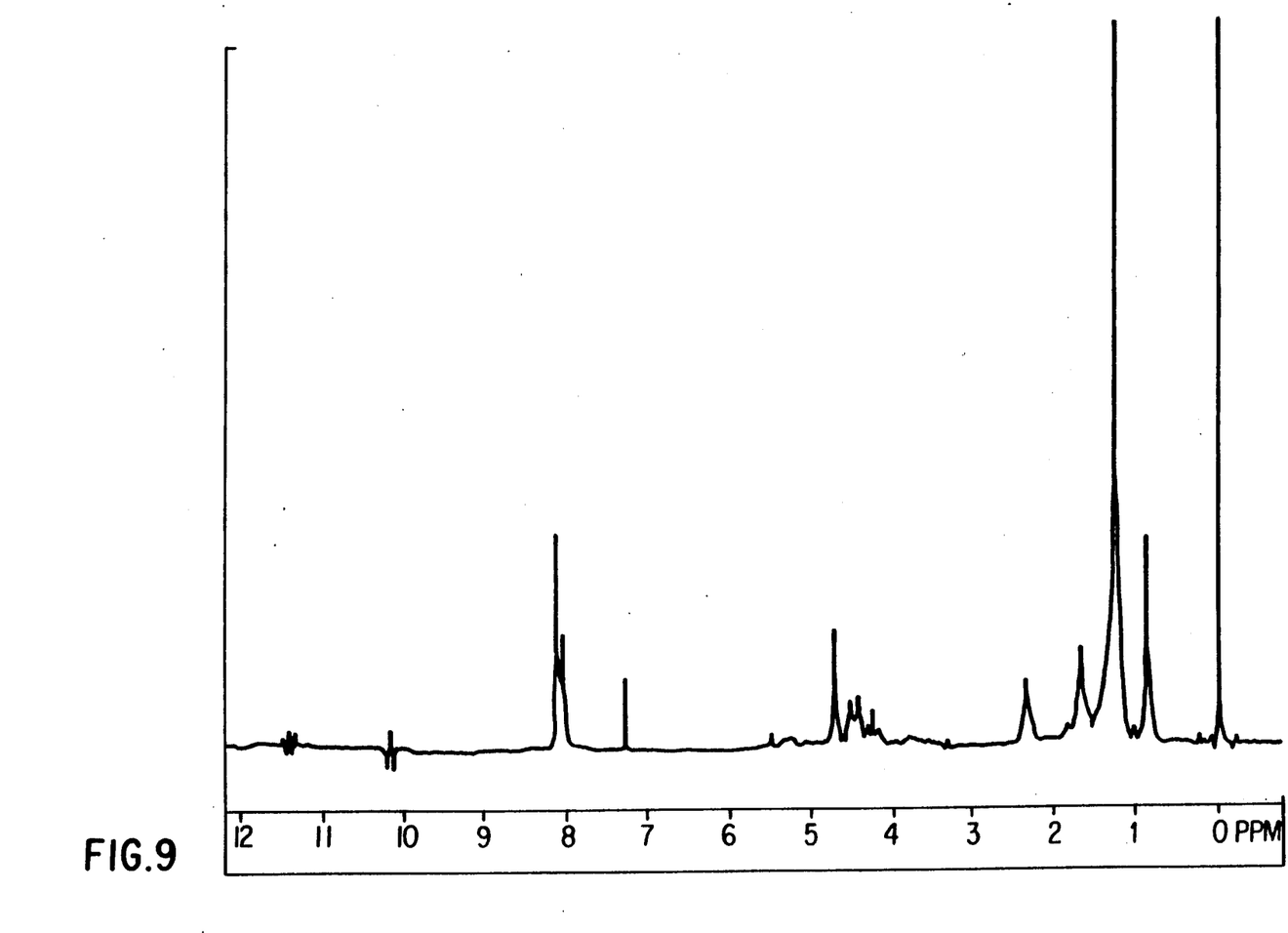
FIG. 9 is a $^1$H-NMR spectrum of the polymer obtained in Example 7.

The thus obtained polymer was pale yellow and transparent and had a logarithmic viscosity ($\eta_{inh}$) of 0.55 dl/g (measured under the same condition as in Example 1). FIG. 9 shows the $^1$H-NMR spectrum of the polymer obtained.

EXAMPLE 8

1.96 g (0.0118 mol) of phthalic acid, 30.0 g (0.118 mol) of bishydroxyethyl terephthalate, 6.51 g of the above-mentioned linear monoepoxy compound (AOEX-68, trade name by Daisel Co.) and 0.005 g of tetrabutoxy titanium were fed into a glass polymerizer tube equipped with a stirring blade, a nitrogen-introducing duct and a pressure-reducing duct, and a cycle of pressure reduction-nitrogen substitution was effected three times.

The polymerizer tube was heated up to 150° C. and the reactants were reacted for 4 hours at normal pressure. Next, the internal pressure was gradually lowered to a reduced pressure of 0.5 mmHg. The reaction temperature was gradually elevated up to 270° C. and polymerization was effected for 2 hours. Afterwards, nitrogen was introduced into the polymerizer tube so that the internal pressure was returned back to normal pressure and the polymerization was stopped. The product formed was able to be taken out from the bottom of the polymerizer tube. The thus obtained polymer was pale brown and transparent and had a logarithmic viscosity ($\eta_{inh}$) of 0.47 gl/g, in a mixed solvent of phenol/tetra-chloroethane (50/50, by weight) in a concentration of 0.5 g/dl, at 30° C.

EXAMPLE 9

1.72 g (0.0118 mol) of adipic acid, 30.0 g (0.118 mol) of bishydroxyethyl terephthalate, 6.51 g of linear monoepoxy compound (AOEX-68, trade name by Daisel Co.) and 0.005 g of tetrabutoxy titanium were fed into the same polymerizer tube as that employed in Example 8, and a cycle of pressure reduction-nitrogen substitution was effected three times.

The polymerizer tube was heated up to 150° C. and the reactants were reacted for 3.5 hours at normal pressure. Next, the pressure in the polymerizer tube was gradually reduced to a reduced pressure of 0.5 mmHg. The reaction temperature was gradually elevated up to 270° C. and polymerization was effected for 2 hours. Afterwards, nitrogen was introduced into the polymerizer tube so that the internal pressure was returned back to normal pressure and the polymerization was stopped. The product formed was able to be taken out from the bottom of the polymerizer tube. The thus obtained polymer was pale brown and transparent and had a logarithmic viscosity ($\eta_{inh}$) of 0.42 dl/g (measured under the same condition as in Example 8).

EXAMPLE 10

1.72 g (0.0118 mol) of adipic acid, 30.0 g (0.118 mol) of bishydroxyethyl terephthalate, 5.7 g of linear monoepoxy compound (AOEX-24, trade name by Daisel Co.) and 0.005 g of tetrabutoxy titanium were fed into the same polymerizer tube as that employed in Example 8 and were processed in accordance with the same procedure as in Example 9. AOEX-24 is a mixture (about 1:1, by weight) of the compound of the above-mentioned formula (III) where $R_0$ is $C_{10}$ linear alkyl group and n=0, and the compound of the formula (III) where $R_0$ is $C_{12}$ linear alkyl group and n=0. The product formed was able to be taken out from the bottom of the polymerizer tube. The thus obtained polymer was pale yellow and transparent and had a logarithmic viscosity ($\eta_{inh}$) of 0.63 dl/g (measured under the same condition as in Example 8).

EXAMPLE 11

1.72 g (0.0118 mol) of adipic acid, 30.0 g (0.118 mol) of bishydroxyethyl terephthalate, 3.07 g (0.0236 mol) of n-butylglycidyl ether and 0.005 g of tetrabutoxy titanium were fed into the same polymerizer tube as that employed in Example 8 and were processed in accordance with the same procedure as in Example 9. The product formed was able to be taken out from the bottom of the polymerizer tube. The thus obtained polymer was pale brown and transparent and had a logarithmic viscosity ($\eta_{inh}$) of 0.55 dl/g (measured under the same condition as in Example 8).

EXAMPLE 12

1.72 g (0.0118 mol) of adipic acid and 6.51 g of linear monoepoxy compound (AOEX-68, trade name by Daisel Co.) were fed into the same polymerizer tube as that empolyed in Example 8, and a cycle of pressure reduction-nitrogen substitution was effected three times. The polymerizer tube was heated up to 150° C. and the reactants therein were reacted for 3.5 hours at normal pressure. Next, 25.0 g of polyethylene terephthalate was added thereto and the reaction temperature was elevated up to 280° C., whereupon reaction was continued for one hour. Afterwards, the internal pressure was gradually lowered and the content in the polymerizer tube was stirred for one hour. Next, nitrogen was introduced into the tube so that the internal pressure was returned back to normal pressure and polymerization was stopped. The product formed was able to be taken out from the bottom of the polymerizer tube.

The thus obtained polymer was pale yellow and transparent and had a logarithmic viscosity ($\eta_{inh}$) of 0.45 dl/g (measured under the same condition as in Example 8).

EXAMPLE 13

1.72 g (0.0118 mol) of adipic acid, 6.51 g of linear monoepoxy compound (AOEX-68, trade name by Daisel Co.) and 25.0 g of polybutylene terephthalate were fed into the same polymerizer tube as that employed in Example 8, the reaction temperature was elevated up to 280° C. and reaction was effected for one hour under the heated condition. Afterwards, the internal pressure was gradually reduced and stirring was continued for further 2 hours. Then, nitrogen was introduced into the polymerizer tube so that the internal pressure was returned back to normal pressure and polymerization was stopped. The product formed was able to be taken out from the bottom of the polymerizer tube.

The thus obtained polymer was pale yellow and transparent and had a logarithmic viscosity ($\eta_{inh}$) of 0.52 dl/g (measured under the same condition as in Example 8).

EXAMPLE 14

10.34 g (0.0708 mol) of adipic acid, 39.06 g of linear monoepoxy compound (AOEX-68, trade name by Daisel Co.) and 90.00 g (0.354 mol) of bishydroxyethyl terephthalate were fed into the same polymerizer tube as that empolyed in Example 8. The acid degree in the initial stage of the reaction may be obtained as the proportion (mol/g) of the number of the carboxyl groups (=(number of mols of adipic acid fed)×2) to the weight of total reactants fed. Accordingly, the acid degree in the present case is $1.0 \times 10^{-3}$ mol/g. Next, reaction was effected at 230° C. for 3 hours and then the acid degree of the reaction mixture was measured by acid-base titration to be $5.6 \times 10^{-5}$ mol/g. Next, 7.0 g of antimony trioxide-1% ethylene glycol solution was added to the reaction mixture, and the internal pressure was gradually lowered with maintaining the temperature to be 230° C. Accordingly, stirring was effected for 6 hours under the reduced pressure. Next, the internal pressure was returned back to normal pressure with nitrogen. The product formed was able to be taken out from the bottom of the polymerizer tube.

The thus obtained polymer was pale yellow and transparent and had a logarithmic viscosity ($\eta_{inh}$) of 0.58 dl/g (measured under the same condition as in Example 8).

EXAMPLE 15

4.70 g (0.0283 mol) of terephthalic acid, 7.05 g (0.0424 mol) of isophthalic acid, 39.06 g of linear monoepoxy compound (AOEX-68, trade name by Daisel Co.) and 90.00 g (0.354 mol) of bishydroxyethyl terephthalate were fed into the same polymerizer tube as that employed in Example 8 (whereupon the acid degree in the initial stage of the reaction was $1.0 \times 10^{-3}$ mol/g) and reacted at 230° C. for 3 hours. After the reaction, the acid degree of the resulting reaction mixture was $5.4 \times 10^{-5}$ mol/g.

To the reaction mixture was added 0.14 g of tetrabutoxy titanium. The internal pressure was then gradually lowered with maintaining the reaction temperature to be 230° C., and stirring was effected for further 4 hours. Next, the internal pressure was returned back to normal pressure with nitrogen and polymerization was stopped.

The product formed was able to be taken out from the bottom of the polymerizer tube. The thus obtained polymer was pale yellow and transparent and had a logarithmic viscosity ($\eta_{inh}$) of 0.62 dl/g (measured under the same condition as in Example 8).

EXAMPLE 16

2.16 g (0.0148 mol) of adipic acid, 50.0 g (0.196 mol) of bishydroxyethyl terephthalate and 11.0 g of linear monoepoxy compound (AOEY-08, trade name by Daisel Co.) were fed into the same polymerizer tube as that employed in Example 8 and reacted for 4 hours at 230° C. After the reaction, the acid degree of the reaction mixture was $3.8 \times 10^{-5}$ mol/g.

To the reaction mixture was added 0.03 g of tetrabutoxy titanium. The internal pressure was then gradually lowered with maintaining the reaction temperature to be 230° C. After stirring was effected for 7 hours, the reduced internal pressure was returned back to normal pressure with nitrogen and polymerization was stopped.

The product formed was able to be taken out from the bottom of the polymerizer tube. The thus obtained polymer was pale yellow and transparent and had a logarithmic viscosity ($\eta_{inh}$) of 0.40 dl/g (measured under the same condition as in Example 8).

EXAMPLE 17

Figure 10:
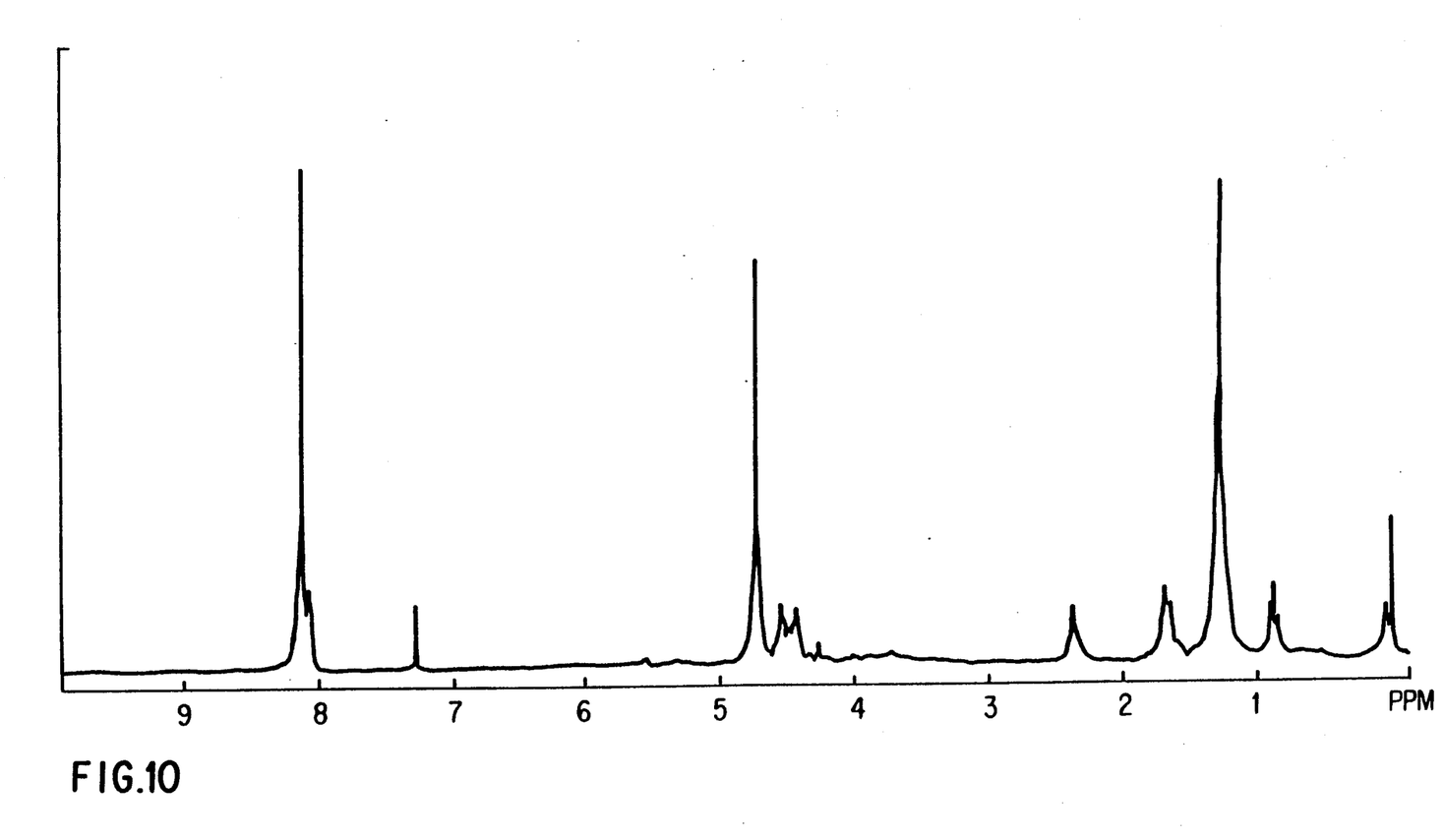
FIG. 10 is a $^1$H-NMR spectrum of the polymer obtained in Example 17.

3.45 g (0.0236 mol) of adipic acid, 30.0 g (0.118 mol) of bishydroxyethyl terephthalate, 9.77 g of linear monoepoxy compound (AOEX-68, trade name by Daisel Co.) and 3.10 g (0.0118 mol) of 1-(3-glycidoxypropyl)-1,1,3,3,3-pentamethyldisiloxane were fed into the same polymerizer tube as that empolyed in Example 8, and a cycle of pressure reduction-nitrogen substitution was effected three times. The polymerizer tube was heated up to 230° C. and the reactants were reacted for 3.5 hours at normal pressure. Next, 0.033 g of antimony trioxide was added thereto and the internal pressure was gradually reduce. Under such reduced pressure condition, polymerization was effected for 4 hours. Next, nitrogen was introduced into the polymerizer tube so that the internal pressure was returned back to normal pressure, and the product formed was taken out from the bottom of the polymerizer tube. The thus obtained polymer was pale yellow and transparent and had a logarithmic viscosity ($\eta_{inh}$) of 0.57 dl/g (measured under the same condition as in Example 8). FIG. 10 shows the $^1$H-NMR spectrum of the polymer obtained.

EXAMPLE 18

0.86 g (0.0059 mol) of adipic acid, 30.0 g (0.118 mol) of bishydroxyethyl terephthalate and 3.10 g (0.0118 mol) of 1-(3-glycidoxypropyl)-1,1,3,3,3-pentamethyldisiloxane were fed into the same polymerizer tube as that empolyed in Example 8, and a cycle of pressure reduction-nitrogen substitution was effected three times. The polymerizer tube was heated up to 230° C. and the reactants were reacted for 3.5 hours at normal pressure. Next, 0.03 g of antimony trioxide was added thereto and the internal pressure was gradually reduced, whereupon the polymerization temperature was elevated from 230° C. to 260° C. over a period of 2 hours. Accordingly, polymerization was effected for a total period of 2.5 hours under reduced pressure. Next, nitrogen was introduced into the polymerizer tube and the product formed was taken out from the bottom of the tube. The thus obtained polymer was pale yellow and transparent and had a logarithmic viscosity ($\eta_{inh}$) of 0.63 dl/g (measured under the same condition as that in Example 8).

What we claim is:

1. A polyester, which is composed of a constitutive unit as represented by the following general formula (I) and a constitutive unit as represented by the following general formula (II) in a proportion of (I)/(II) of from 0.1/99.9 to 99.9/0.1 as a molar ratio and which has a logarithmic viscosity ($\eta_{inh}$) of 0.1 or more:

where
- $R_0$ represents an organic group having from 1 to 40 carbon atoms selected from an alkyl group, a cycloalkyl group, an aryl group, an alkyloxy group and a silicon-containing group;
- $R_1$, $R_2$ $R_3$ independently represent a divalent organic group having from 1 to 40 carbon atoms; and
- n represents 0 or 1.

2. The polyester as claimed in claim 1, in which $R_0$ represents an alkyl group.

3. The polyester as claimed in claim 2, in which $R_0$ represents an alkyl group having from 4 to 30 carbon atoms.

4. The polyester as claimed in claim 1, in which $R_1$ represents an aromatic dicarboxylic acid residue having from 6 to 15 carbon atoms or an aliphatic dicarboxylic acid residue having from 1 to 10 carbon atoms.

5. The polyester as claimed in claim 4, in which $R_1$ represents a residue of a terephthalic acid, isophthalic acid or naphthalenedicarboxylic acid.

6. The polyester as claimed in claim 1, in which $R_2$ represents a divalent organic group having from 2 to 20 carbon atoms.

7. The polyester as claimed in claim 6, in which $R_2$ represents an aliphatic or alicyclic diol residue having from 2 to 20 carbon atoms.

8. The polyester as claimed in claim 1, in which $R_3$ represents an aromatic dicarboxylic acid residue having from 6 to 15 carbon atoms, an aliphatic dicarboxylic acid residue having from 1 to 10 carbon atoms, or a residue of a dimer acid or a hydrogenated product thereof.

9. The polyester as claimed in claim 8, in which $R_3$ represents at least one selected from the group consisting of residues of terephthalic acids, isophthalic acids, phthalic acids, naphthalenedicarboxylic acids, adipic acids, sebasic acids, dimer acids and hydrogenated dimer acids.

10. A method of preparing a polyester, which comprises polymerizing (A) a monoepoxy compound of a general formula (III):

$$H_2C\underset{O}{\overset{}{\diagdown\diagup}}CH-(CH_2)_n-R_0 \qquad (III)$$

in which $R_0$ represents an organic group having from 1 to 40 carbon atoms selected from an alkyl group, a cycloalkyl group, an aryl group, an alkyloxy group and a silicon-containing organic group, and n represents 0 or 1, (B) a polyester or a polyester precursor and (C) a dicarboxylic acid compound, wherein the proportion of the monoepoxy compound (A) is from 10 to 100 parts by weight and that of the dicarboxylic acid compound (C) is from 10 to 100 parts by weight, each to 100 parts by weight of the polyester or polyester precursor (B), wherein the method is selected from:

(i) the monoepoxy compound (A) is first reacted with the dicarboxylic acid compound (C) and thereafter reacted with the polyester or polyester precursor (B), or (ii) the monoepoxy compound (A), the polyester or polyester precursor (B) and the dicarboxylic acid compound (C) are reacted at the same time.

11. The method of preparing a polyester as claimed in claim 10, in which $R_0$ is an alkyl group.

12. The method of preparing a polyester as claimed in claim 11, in which $R_0$ is an alkyl group having from 4 to 30 carbon atoms.

13. The method of preparing a polyester as claimed in claim 10, in which the component (B) is an aromatic ring-containing polyester or polyester precursor.

14. The method of preparing a polyester as claimed in claim 10, in which the component (C) is an aromatic dicarboxylic acid having from 8 to 20 carbon atoms, an aliphatic dicarboxylic acid having from 3 to 15 carbon atoms, a dimer acid or a hydrogenated dimer acid.

15. The method of preparing a polyester as claimed in claim 10, in which the molar ratio of the reactant (A) to the reactant (C) to be employed in the reaction is from 1.5/1 to 2.0/1, the reaction is effected at normal pressure until the acid degree of the reaction mixture has reached less than 10% of that of the mixture in the initial stage of the reaction, and then the reaction pressure is initiated to be reduced.

16. The method of preparing a polyester as claimed in claim 10, in which the monoepoxy compound (A) is first reacted with the dicarboxylic acid compound (C) and thereafter reacted with the polyester or polyester precursor (B).

* * * * *